(12) United States Patent
Palmer et al.

(10) Patent No.: US 8,445,575 B2
(45) Date of Patent: *May 21, 2013

(54) THERMOPLASTIC ARTICLES INCLUDING POLYHYDROXY POLYMERS

(75) Inventors: Robert J. Palmer, Jonzier-Epagny (FR); Toshikazu Kobayashi, Chadds Ford, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,311

(22) Filed: Jul. 30, 2009

(65) Prior Publication Data

US 2010/0028581 A1 Feb. 4, 2010

Related U.S. Application Data

(60) Provisional application No. 61/137,345, filed on Jul. 30, 2008.

(51) Int. Cl.
*C08K 5/17* (2006.01)
*C08K 5/13* (2006.01)

(52) U.S. Cl.
USPC .......................... 524/257; 524/186

(58) Field of Classification Search
USPC .......................... 524/236, 186, 257
See application file for complete search history.

(56) References Cited

U.S. PATENT DOCUMENTS

| 6,733,854 | B2 * | 5/2004 | Lee et al. | 428/35.8 |
| 2004/0238793 | A1 * | 12/2004 | Hossan et al. | 252/500 |
| 2005/0113532 | A1 | 5/2005 | Fish, Jr. et al. | |
| 2007/0117901 | A1 * | 5/2007 | Suzuki et al. | 524/442 |
| 2007/0155877 | A1 * | 7/2007 | Shinohara | 524/195 |

FOREIGN PATENT DOCUMENTS

| EP | 1041109 | | 10/2000 |
| EP | 1 698 661 | | 6/2006 |
| JP | 2005-145996 | * | 6/2005 |
| WO | 2005-018892 | | 3/2005 |

OTHER PUBLICATIONS

Machine translation of JP 2005-145996. Jun. 2005.*

* cited by examiner

*Primary Examiner* — John Uselding

(57) ABSTRACT

Disclosed is a molded or extruded thermoplastic article having high heat stability, including a thermoplastic polyamide composition including (a) a polyamide resin; (b) 0.25 to 20 weight percent of one or more polyhydroxy polymer(s) having a number average molecular weight of at least 2000; (c) 0.1 to 3 weight percent of one or more co-stabilizer(s) selected from the group consisting of secondary aryl amines, hindered amine light stabilizers, hindered phenols, and mixtures thereof; (d) 0 to less than 10 weight percent of one or more reinforcement agents; and (f) 0 to 20 weight percent of a polymeric toughener; wherein the composition has an air oven aging retention of elongation at break of at least 50 percent, as compared to that of an unexposed control of identical composition and shape.

10 Claims, No Drawings

THERMOPLASTIC ARTICLES INCLUDING POLYHYDROXY POLYMERS

CROSS REFERENCE TO RELATED APPLICATION

This application claims the benefit of priority of U.S. Provisional Application No. 61/137,345, filed on 30 Jul. 2008 and currently pending.

FIELD OF THE INVENTION

The present invention relates to the field of molded and extruded thermoplastic articles having improved heat stability.

BACKGROUND OF THE INVENTION

High temperature resins based on polyamides possess desirable chemical resistance, processability and heat resistance. This makes them particularly well suited for demanding high performance automotive and electrical/electronics applications. There is a current and general desire in the automotive field to have high temperature resistant structures since temperatures higher than 150° C., even higher than 200° C., are often reached in underhood areas of automobiles. When plastic parts are exposed to such high temperatures for a prolonged period, such as in automotive under-the-hood applications or in electrical/electronics applications, the mechanical properties generally tend to decrease due to the thermo-oxidation of the polymer. This phenomenon is called heat aging.

In an attempt to improve heat aging characteristics, it has been the conventional practice to add heat stabilizers (also referred as antioxidants) to thermoplastic compositions comprising polyamide resins. Examples of such heat stabilizers include hindered phenol antioxidants, amine antioxidants and phosphorus-based antioxidants. For polyamide compositions, three types of heat stabilizers are conventionally used to retain the mechanical properties of the composition upon exposure to high temperatures. One is the use of phenolic antioxidants optionally combined with a phosphorus based synergist as previously mentioned, the use of aromatic amines optionally combined with a phosphorus based synergist and the third one is the use of copper salts and derivatives. Phenolic antioxidants are known to improve the mechanical/physical properties of the thermoplastic composition up to an aging temperature of 120° C.

Existing technologies lead not only to a poor improvement of long-term heat aging resistance, but also the improved heat aging characteristics are insufficient for more demanding applications involving exposure to higher temperatures such as for example in automotive under-the-hood applications and in electrical/electronics applications.

EP 1041109 discloses a polyamide composition comprising a polyamide resin, a polyhydric alcohol having a melting point of 150 to 280° C., that has good fluidity and mechanical strength and is useful in injection welding techniques.

Another problem is the heat ageing performance of polyamide compositions that generally have low levels of reinforcing agents or none at all. Since unreinforced compositions are generally used in applications that require some flexibility; an important attribute of unreinforced thermoplastics is the retention of strain at break upon heat ageing.

Unfortunately, with existing technologies, molded articles based on flexible polyamide compositions having low levels of reinforcing agent, or none at all, either suffer from an unacceptable deterioration of their mechanical properties upon long-term high temperature exposure or they are very expensive due to the use of high-cost heat stabilizers.

There remains a need for low-cost polyamide compositions that are suitable for manufacturing articles and that exhibit good mechanical properties after long-term high temperature exposure.

SUMMARY OF THE INVENTION

There is disclosed and claimed herein a molded or extruded thermoplastic article comprising a thermoplastic polyamide composition comprising
 (a) a polyamide resin having a melting point and/or glass transition;
 (b) 0.25 to 20 weight percent of one or more polyhydroxy polymer(s) selected from the group consisting of ethylene/vinyl alcohol copolymer and poly(vinyl alcohol) having a number average molecular weight of at least 2000;
 (c) 0.1 to 3 weight percent of one or more co-stabilizer(s) having a 10% weight loss temperature, as determined by thermogravimetric analysis, of greater than 30° C. below said melting point of polyamide if said melting point is present, or at least 250° C. if said melting point is not present, said one or more co-stabilizer(s) selected from the group consisting of secondary aryl amines, hindered amine light stabilizers, hindered phenols, and mixtures thereof;
 (d) 0 to less than 10 weight percent of one or more reinforcement agents; and
 (e) 0 to 20 weight percent of a polymeric toughener comprising a reactive functional group and/or a metal salt of a carboxylic acid;
wherein molded 4 mm test bars prepared from said polyamide composition, and exposed at an test temperature of 150° C. for a test period of at or about 500 hours, in an atmosphere of air, and tested according to ISO 527-2/1A, have, on average, a retention of elongation at break of at least 50 percent, as compared to that of an unexposed control of the same composition and shape.

DETAILED DESCRIPTION OF THE INVENTION

For the purposes of the description, unless otherwise specified, "high-temperature" means a temperature at or higher than 150° C.

In the present invention, unless otherwise specified, "long-term" refers to an exposure period of 500 hrs.

As used herein, the term "high heat stability", as applied to the polyamide composition disclosed herein or to an article made from the composition, refers to the retention of physical properties (for instance, tensile strength) of 4 mm thick molded test bars consisting of the composition that are exposed to air oven aging (AOA) conditions in an oven at a test temperature of 150° C. for a test period of at or about 500 h, in an atmosphere of air, and then tested according to ISO 527-2/1A method. The physical properties of the test bars are compared to that of unexposed controls that have identical composition and shape, and are expressed in terms of "% retention". Herein "high heat stability" means that said molded test bars, on average, meet or exceed a retention for elongation at break of 50% when exposed at a test temperature of 150° C. for a test period of at or about 500 h. Compositions exhibiting a higher retention of physical properties for a given exposure temperature and time period have better heat stability.

The term "(meth)acrylate" is meant to include acrylate esters and methacrylate esters.

The polyamide resin used in the present invention has a melting point and/or glass transition. Herein melting points and glass transitions are as determined with differential scanning calorimetry (DSC) at a scan rate of 10° C./min in the first heating scan, wherein the melting point is taken at the maximum of the endothermic peak and the glass transition, if evident, is considered the mid-point of the change in enthalpy.

Polyamides are condensation products of one or more dicarboxylic acids and one or more diamines, and/or one or more aminocarboxylic acids, and/or ring-opening polymerization products of one or more cyclic lactams. Suitable cyclic lactams are caprolactam and laurolactam. Polyamides may be fully aliphatic or semi-aromatic.

Fully aliphatic polyamides used in the resin composition of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid (C6), pimelic acid (C7), suberic acid (C8), azelaic acid (C9), decanedioic acid (C10), dodecanedioic acid (C12), tridecanedioic acid (C13), tetradecanedioic acid (C14), and pentadecanedioic acid (C15). Diamines can be chosen among diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

The semi-aromatic polyamide is a homopolymer, a copolymer, a terpolymer or more advanced polymers formed from monomers containing aromatic groups. One or more aromatic carboxylic acids may be terephthalate or a mixture of terephthalate with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids, as disclosed above. Alternatively, an aromatic diamine such as meta-xylylene diamine (MXD) can be used to provide a semi-aromatic polyamide, an example of which is MXD6, a homopolymer comprising MXD and adipic acid.

Preferred polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides (PA):

HMD hexamethylene diamine (or 6 when used in combination with a diacid)
T Terephthalic acid
AA Adipic acid
DMD Decamethylenediamine
6 ϵ-Caprolactam
DDA Decanedioic acid
DDDA Dodecanedioic acid
I Isophthalic acid
MXD meta-xylylene diamine
TMD 1,4-tetramethylene diamine
4T polymer repeat unit formed from TMD and T
6T polymer repeat unit formed from HMD and T
DT polymer repeat unit formed from 2-MPMD and T
MXD6 polymer repeat unit formed from MXD and M
66 polymer repeat unit formed from HMD and M
10T polymer repeat unit formed from DMD and T
410 polymer repeat unit formed from TMD and DDA
510 polymer repeat unit formed from 1,5-pentanediamine and DDA
610 polymer repeat unit formed from HMD and DDA
612 polymer repeat unit formed from HMD and DDDA
6 polymer repeat unit formed from ϵ-caprolactam
11 polymer repeat unit formed from 11-aminoundecanoic acid
12 polymer repeat unit formed from 12-aminododecanoic acid Note that in the art the term "6" when used alone designates a polymer repeat unit formed from ϵ-caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

In one embodiment the polyamide composition comprises a one or more polyamides selected from the group consisting of Group (I) Polyamides having said melting point of less than 210° C., and comprising an aliphatic or semiaromatic polyamide selected from the group poly(pentamethylene decanediamide) (PA510), poly(pentamethylene dodecanediamide) (PA512), poly(ϵ-caprolactam/hexamethylene hexanediamide) (PA6/66), poly(ϵ-caprolactam/hexamethylene decanediamide) (PA6/610), poly(ϵ-caprolactam/hexamethylene dodecanediamide) (PA6/612), poly(hexamethylene tridecanediamide) (PA613), poly(hexamethylene pentadecanediamide) (PA615), poly(ϵ-caprolactam/tetramethylene terephthalamide) (PA6/4T), poly(ϵ-caprolactam/hexamethylene terephthalamide) (PA6/6T), poly(ϵ-caprolactam/decamethylene terephthalamide) (PA6/10T), poly(ϵ-caprolactam/dodecamethylene terephthalamide) (PA6/12T), poly(hexamethylene decanediamide/hexamethylene terephthalamide) (PA610/6T), poly(hexamethylene dodecanediamide/hexamethylene terephthalamide) (PA612/6T), poly (hexamethylene tetradecanediamide/hexamethylene terephthalamide) (PA614/6T), poly(ϵ-caprolactam/hexamethylene isophthalamide/hexamethylene terephthalamide) (PA6/6I/6T), poly(ϵ-caprolactam/hexamethylene hexanediamide/hexamethylene decanediamide) (PA6/66/610), poly(ϵ-caprolactam/hexamethylene hexanediamide/hexamethylene dodecanediamide) (PA6/66/612), poly(ϵ-caprolactam/hexamethylene hexanediamide/hexamethylene decanediamide/hexamethylene dodecanediamide) (PA6/66/610/612), poly(2-methylpentamethylene hexanediamide/hexamethylene hexanediamide/hexamethylene terephthalamide) (PA D6/66//6T), poly(2-methylpentamethylene hexanediamide/hexamethylene hexanediamide/) (PA D6/66), poly(decamethylene decanediamide) (PA1010), poly(decamethylene dodecanediamide) (PA1012), poly(decamethylene decanediamide/decamethylene terephthalamide) (PA1010/10T) poly(decamethylene decanediamide/dodecamethylene decanediamide/decamethylene terephthalamide/ dodecamethylene terephthalamide (PA1010/1210/10T/ 12T), poly(11-aminoundecanamide) (PA11), poly(11-aminoundecanamide/tetramethylene terephthalamide) (PA11/4T), poly(11-aminoundecanamide/hexamethylene terephthalamide) (PA11/6T), poly(11-aminoundecanamide/decamethylene terephthalamide) (PA11/10T), poly(11-aminoundecanamide/dodecamethylene terephthalamide) (PA11/12T), poly(12-aminododecanamide) (PA12), poly(12-aminododecanamide/tetramethylene terephthalamide) (PA12/4T), poly(12-aminododecanamide/hexamethylene terephthalamide) (PA12/6T), poly(12-aminododecanamide/decamethylene terephthalamide) (PA12/10T) poly(dodecamethylene dodecanediamide) (PA1212), and poly(dodecamethylene dodecanediamide/dodecamethylene dodecanediamide/dodecamethylene terephthalamide)) (PA1212/12T);

Group (II) Polyamides having said melting point of at least 210° C., and comprising an aliphatic polyamide selected from the group consisting of poly(tetramethylene hexanediamide) (PA46), poly(ε-caprolactam) (PA 6), poly (hexamethylene hexanediamide/(ε-caprolactam/) (PA 66/6) poly(hexamethylene hexanediamide) (PA 66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), poly(hexamethylene hexadecanediamide) (PA616), and poly(tetramethylene hexanediamide/2-methylpentamethylene hexanediamide) (PA46/D6);

Group (III) Polyamides having said melting point of at least 210° C., and comprising
(aa) about 20 to about 35 mole percent semiaromatic repeat units derived from monomers selected from one or more of the group consisting of:
(i) aromatic dicarboxylic acids having 8 to 20 carbon atoms and aliphatic diamines having 4 to 20 carbon atoms; and
(bb) about 65 to about 80 mole percent aliphatic repeat units derived from monomers selected from one or more of the group consisting of:
(ii) an aliphatic dicarboxylic acid having 6 to 20 carbon atoms and said aliphatic diamine having 4 to 20 carbon atoms; and
(iii) a lactam and/or aminocarboxylic acid having 4 to 20 carbon atoms;

Group (IV) Polyamides comprising
(cc) about 50 to about 95 mole percent semiaromatic repeat units derived from monomers selected from one or more of the group consisting of:
(i) aromatic dicarboxylic acids having 8 to 20 carbon atoms and aliphatic diamines having 4 to 20 carbon atoms; and
(dd) about 5 to about 50 mole percent aliphatic repeat units derived from monomers selected from one or more of the group consisting of:
(ii) an aliphatic dicarboxylic acid having 6 to 20 carbon atoms and said aliphatic diamine having 4 to 20 carbon atoms; and
(iii) a lactam and/or aminocarboxylic acid having 4 to 20 carbon atoms;

Group (V) Polyamides having said melting point of at least 260° C., and comprising
(ee) greater than 95 mole percent semiaromatic repeat units derived from monomers selected from one or more of the group consisting of:
(i) aromatic dicarboxylic acids having 8 to 20 carbon atoms and aliphatic diamines having 4 to 20 carbon atoms; and
(ff) less than 5 mole percent aliphatic repeat units derived from monomers selected from one or more of the group consisting of:
(ii) an aliphatic dicarboxylic acid having 6 to 20 carbon atoms and said aliphatic diamine having 4 to 20 carbon atoms;
(iii) a lactam and/or aminocarboxylic acid having 4 to 20 carbon atoms; and Group (VI) Polyamides having no melting point, and selected from the group consisting of poly(hexamethylene isophthalamide/hexamethylene terephthalamide) (6I/6T) and poly(hexamethylene isophthalamide/hexamethylene terephthalamide/hexamethylene hexanediamide) (6I/6T/66).

Group (I) Polyamides may have semiaromatic repeat units to the extent that the melting point is less than 210° C. and generally the semiaromatic polyamides of the group have less than 40 mole percent semiaromatic repeat units. Semiaromatic repeat units are defined as those derived from monomers selected from one or more of the group consisting of: aromatic dicarboxylic acids having 8 to 20 carbon atoms and aliphatic diamines having 4 to 20 carbon atoms.

One embodiment is a molded or extruded thermoplastic article wherein said polyamide resin is selected from Group (II) Polyamides.

Another embodiment is a molded or extruded thermoplastic article wherein said polyamide resin is selected from Group (III) Polyamides selected from the group consisting of poly(tetramethylene hexanediamide/tetramethylene terephthalamide) (PA46/4T), poly(tetramethylene hexanediamide/hexamethylene terephthalamide) (PA46/6T), poly(tetramethylene hexanediamide/2-methylpentamethylene hexanediamide/decamethylene terephthalamide) PA46/D6/10T), poly(hexamethylene hexanediamide/hexamethylene terephthalamide) (PA66/6T), poly(hexamethylene hexanediamide/hexamethylene isophthalamide/hexamethylene terephthalamide PA66/6I/6T, and poly(hexamethylene hexanediamide/2-methylpentamethylene hexanediamide/hexamethylene terephthalamide (PA66/D6/6T). A most preferred Group (III) Polyamide is PA 66/6T.

Another embodiment is a molded or extruded thermoplastic article wherein said polyamide resin is selected from Group (IV) Polyamides selected from the group consisting of poly(tetramethylene terephthalamide/hexamethylene hexanediamide) (PA4T/66), poly(tetramethylene terephthalamide/ε-caprolactam) (PA4T/6), poly(tetramethylene terephthalamide/hexamethylene dodecanediamide) (PA4T/612), poly(tetramethylene terephthalamide/2-methylpentamethylene hexanediamide/hexamethylene hexanediamide) (PA4T/D6/66), poly(hexaamethylene terephthalamide/2-methylpentamethylene hexanediamide) (PA6T/DT/66), poly(hexamethylene terephthalamide/hexamethylene hexanediamide) PA6T/66, poly (hexaamethylene terephthalamide/hexamethylene decanediamide) (PA6T/610), poly(hexamethylene terephthalamide/hexamethylene tetradecanediamide) (PA6T/614), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA 10T/11), poly(decamethylene terephthalamide/12-aminododecanamide) (PA10T/12) poly(decamethylene terephthalamide/decamethylene decanediamide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/ε-caprolactam) (PA10T/6), poly(decamethylene terephthalamide/hexamethylene hexanediamide) (PA10T/66), poly(dodecamethylene terephthalamide/dodecamethylene dodecanediamide) (PA12T/1212), poly(dodecamethylene terephthalamide/ε-caprolactam) (PA12T/6), and poly(dodecamethylene terephthalamide/hexamethylene hexanediamide) (PA12T/66); and a most preferred Group (IV) Polyamide is PA6T/66.

Another embodiment is a molded or extruded thermoplastic article wherein said polyamide resin is selected from Group (V) Polyamides selected from the group consisting of poly(tetramethylene terephthalamide/2-methylpentamethylene terephthalamide) PA4T/DT, poly(tetramethylene terephthalamide/hexamethylene terephthalamide) PA4T/6T, poly(tetramethylene terephthalamide/decamethylene terephthalamide) PA4T/10T, poly(tetramethylene terephthalamide/dodecamethylene terephthalamide)PA4T/12T, poly(tetramethylene terephthalamide/2-methylpentamethylene terephthalamide/hexamethylene terephthalamide) (PA4T/DT/6T), poly(tetramethylene terephthalamide/hexamethylene terephthalamide/2-methylpentamethylene terephthalamide) (PA4T/6T/DT), poly(hexamethylene terephthalamide/2-methylpentamethylene terephthalamide) (PA6T/DT), poly(hexamethylene hexanediamide/hexamethylene isophthalamide) (PA 6T/6I), poly(hexamethylene terephthalamide/decamethylene terephthalamide) PA6T/10T, poly(hexamethylene terephthalamide/dodecamethylene terephthalamide) (PA6T/12T), poly(hexamethylene terephthalamide/2-methylpentamethylene terephthalamide/poly(decamethylene terephthalamide) (PA6T/DT/10T), poly(hexamethylene terephthalamide/decamethylene terephthalamide/dodecamethylene terephthalamide) (PA6T/10T/12T), poly(decamethylene terephthalamide) (PA10T), poly(decamethylene terephthalamide/tetramethylene terephthalamide) (PA10T/4T), poly(decamethylene terephthalamide/2-methylpentamethylene terephthalamide) (PA10T/DT), poly(decamethylene terephthalamide/dodecamethylene terephthalamide) (PA10T/12T), poly(decamethylene terephthalamide/2-methylpentamethylene terephthalamide/(decamethylene terephthalamide) (PA10T/DT/12T). poly(dodecamethylene terephthalamide) (PA12T), poly(dodecamethylene terephthalamide)/tetramethylene terephthalamide) (PA12T/4T), poly(dodecamethylene terephthalamide)/hexamethylene terephthalamide) PA12T/6T, poly(dodecamethylene terephthalamide)/decamethylene terephthalamide) (PA12T/10T), and poly(dodecamethylene terephthalamide)/2-methylpentamethylene terephthalamide) (PA12T/DT); and a most preferred Group (V) Polyamide is PA6T/DT.

A further preferred embodiment is the molded or extruded thermoplastic article wherein said polyamide resin is selected from Group (V) Polyamides and said retention elongation at break is at least 70%, and more preferably at least 80% and 90%, as compared with an unexposed control of identical composition and shape.

In various embodiments the polyamide is a Group (I) Polyamide, Group (II) Polyamide, Group (III) Polyamide, Group (IV) Polyamide, Group (V) Polyamide or Group (VI) Polyamide, respectively.

The polyamides may also be blends of two or more polyamides. Preferred blends include those selected from the group consisting of Group (I) and Group (II) Polyamides; Group (I) and Group (III) Polyamide, Group (I) and Group (VI) Polyamides, Group (II) and Group (III) Polyamides, Group (II) and Group (IV) Polyamides, Group (II) and (V) Polyamides, Group (II) and Group (VI) Polyamides, Group (III) and Group (VI) Polyamides, and Group (IV) and Group (V) Polyamides.

A preferred blend includes Group (II) and Group (V) Polyamides, and a specific preferred blend includes poly(hexamethylene hexanediamide) (PA 66) and poly(hexamethylene terephthalamide/2-methylpentamethylene terephthalamide) (PA 6T/DT).

Another preferred blend includes Group (II) and Group (III) Polyamides and a specific preferred blend includes poly(ε-caprolactam) (PA6) and poly(hexamethylene hexanediamide/hexamethylene terephthalamide (PA66/6T).

The molded or extruded thermoplastic article comprises 0.25 to 20 weight percent of at least one polyhydroxy polymer selected from the group consisting of ethylene/vinyl alcohol copolymer and poly(vinyl alcohol) having a number average molecular weight ($M_n$) of at least 2000; as determined for polymeric materials with gel permeation chromatography (GPC). Preferably the polyhydroxy polymer has a $M_n$ of 5000 to 50,000.

In one embodiment the polyhydroxy polymer is an ethylene/vinyl alcohol copolymer (EVOH). The EVOH may have a vinyl alcohol repeat content of 10 to 90 mol % and preferably 30 to 80 mol %, 40 to 75 mol %, 50 to 75 mol %, and 50 to 60 mol %, wherein the remainder mol % is ethylene. A suitable EVOH for the thermoplastic composition is Soarnol® A or D copolymer available from Nippon Gosei (Tokyo, Japan) and EVAL® copolymers available from Kuraray, Tokyo, Japan.

In one embodiment the polyhydroxy polymer is a poly(vinyl alcohol) polymer (PVOH). Suitable PVOH polymers for the thermoplastic composition are the Mowiol° brand resins available from Kuraray Europe Gmbh.

The molded or extruded thermoplastic article may comprise 1 to 15 weight percent, 1 to 10 weight percent; and preferably 1 to 7 weight percent and more preferably 2 to 7 weight percent polyhydroxy polymer based on the total weight of the thermoplastic polyamide composition.

The use of a polyhydroxy polymer having a $M_n$ of at least 2000 or higher offers a particular advantage in heat stability of polyamide compositions over that of polyhydric alcohols having $M_n$ less than 2000, for instance dipentaerythritol. The polyhydroxy polymer composition tends to have a low "bloom" rate of the polymer to the molded or extruded article surface upon long term exposure to high temperature. Many low molecular weight additives have a tendency to "bloom" or migrate to the surface and crystallize, thus forming an undesirable whitening of the surface; upon long term exposure to high temperature. Furthermore polyhydroxy polymers such as EVOH have overall better heat stability than low molecular weight polyhdric alcohols. For instance, EVOH has a TGA (10° C./min scan speed) weight loss of 1.9 weight % when scanned up to 350° C.; versus a 70% weight loss for dipentaerythritol under the same conditions.

The polyamide composition comprises 0.1 to 3 weight percent of one or more co-stabilizer(s) having a 10% weight loss temperature, as determined by thermogravimetric analysis (TGA), of greater than 30° C. below the melting point of the polyamide resin, if a melting point is present, or at least 250° C. if said melting point is not present, selected from the group consisting of secondary aryl amines, hindered phenols and hindered amine light stabilizers (HALS), and mixtures thereof.

For the purposes of this invention, TGA weight loss will be determined according to ASTM D 3850-94, using a heating rate of 10° C./min, in air purge stream, with an appropriate flow rate of 0.8 mL/second. The one or more co-stabilizer(s) preferably has a 10% weight loss temperature, as determined by TGA, of at least 270° C., and more preferably 290° C., 320° C., and 340° C., and most preferably at least 350° C.

The one or more co-stabilizers preferably are present from at or about 0.1 to at or about 3 weight percent, more preferably at or about 0.1 to at or about 1 weight percent; or more preferably from at or about 0.1 to at or about 0.7 weight percent, based on the total weight of the polyamide composition.

Secondary aryl amines useful in the invention are high molecular weight organic compound having low volatility. Preferably, the high molecular weight organic compound will be selected from the group consisting of secondary aryl amines further characterized as having a molecular weight of at least 260 g/mol and preferably at least 350 g/mol, together with a 10% weight loss temperature as determined by thermogravimetric analysis (TGA) of at least 290° C., preferably at least 300° C., 320° C., 340° C., and most preferably at least 350° C.

By secondary aryl amine is meant an amine compound that contains two substituents chemically bound to a nitrogen atom where at least one, and preferably both substituents, are aromatic. Preferably, at least one of the aromatic substituents, such as, for example, a phenyl, naphthyl or heteroaromatic group, is substituted with at least one substituent, preferably containing 1 to about 20 carbon atoms.

Examples of suitable secondary aryl amines include 4,4'di (α,α-dimethylbenzyl)diphenylamine available commercially as Naugard 445 from Uniroyal Chemical Company, Middlebury, Conn.; the secondary aryl amine condensation product of the reaction of diphenylamine with acetone, available commercially as Aminox from Uniroyal Chemical Company; and para-(paratoluenesulfonylamido) diphenylamine also available from Uniroyal Chemical Company as Naugard SA. Other suitable secondary aryl amines include N,N'-di-(2-naphthyl)-p-phenylenediamine, available from ICI Rubber Chemicals, Calcutta, India. Other suitable secondary aryl amines include 4,4'-bis(α,α'-tertiaryoctyl)diphenylamine, 4,4'-bis(α-methylbenzhydryl)diphenylamine, and others from EP 0509282 B1. A preferred co-stabilizer for the polyamide composition is a secondary aryl amine.

By hindered phenol is meant an organic compound containing at least one phenol group wherein the aromatic moiety is substituted at least at one and preferably at both positions directly adjacent to the carbon having the phenolic hydroxyl group as a substituent. The substituents adjacent the hydroxyl group are alkyl radicals suitably selected from alkyl groups having from 1 to 10 carbon atoms, and preferably will be tertiary butyl groups. The molecular weight of the hindered phenol is suitably at least about 260, preferably at least about 500, more preferably at least about 600. Most preferred are hindered phenols having low volatility, particularly at the processing temperatures employed for molding the formulations, and may be further characterized as having a 10% TGA weight loss temperature of at least 290° C., preferably at least 300° C., 320° C., 340° C., and most preferably at least 350° C.

Suitable hindered phenol compounds include, for example, tetrakis (methylene (3,5-di-(tert)-butyl-4-hydroxyhydrocinnamate)) methane, available commercially as Irganox® 1010 from CIBA Specialty Chemicals, Tarrytown, N.Y. and N,N'-hexamethylene bis (3,5-di-(tert)butyl-hydroxyhydro-cinnamamide) also available from CIBA Specialty Chemicals as Irganox® 1098. Other suitable hindered phenols include 1,3, 5-trimethyl-2,4,6tris(3,5-di-(tert)-butyl-4-hydroxybenzyl) benzene and 1,6hexamethylene bis (3,5-di-(tert) butyl4hydroxy hydrocinnamate), both available from CIBA Specialty Chemicals as Irganox® 1330 and 259, respectively. A preferred co-stabilizer for the polyamide composition is a hindered phenol. Irganox 1098 is a most preferred hindered phenol for the compositions.

The hindered amine light stabilizers (HALS) may be one or more hindered amine type light stabilizers (HALS).

HALS are compounds of the following general formulas and combinations thereof:

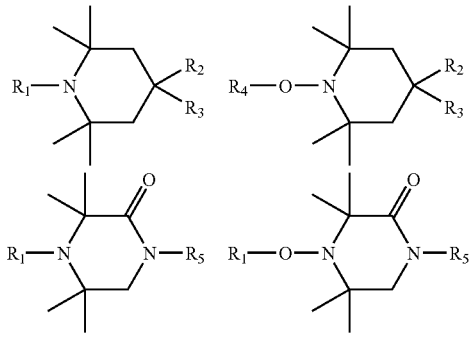

In these formulas, $R_1$ up to and including $R_5$ are independent substituents. Examples of suitable substituents are hydrogen, ether groups, ester groups, amine groups, amide groups, alkyl groups, alkenyl groups, alkynyl groups, aralkyl groups, cycloalkyl groups and aryl groups, in which the substituents in turn may contain functional groups; examples of functional groups are alcohols, ketones, anhydrides, imines, siloxanes, ethers, carboxyl groups, aldehydes, esters, amides, imides, amines, nitriles, ethers, urethanes and any combination thereof. A hindered amine light stabilizer may also form part of a polymer or oligomer.

Preferably, the HALS is a compound derived from a substituted piperidine compound, in particular any compound derived from an alkyl-substituted piperidyl, piperidinyl or piperazinone compound, and substituted alkoxypiperidinyl compounds. Examples of such compounds are: 2,2,6,6-tetramethyl-4-piperidone; 2,2,6,6-tetrametyl-4-piperidinol; bis-(1,2,2,6,6-pentamethyl piperidyl)-(3',5'-di-tert-butyl-4'-hydroxybenzyl) butylmalonate; di-(2,2,6,6-tetramethyl-4-piperidyl) sebacate (Tinuvin® 770, MW 481); oligomer of N-(2-hydroxyethyl)-2,2,6,6-tetramethyl-4-piperidinol and succinic acid (Tinuvin® 622); oligomer of cyanuric acid and N,N-di(2,2,6,6-tetramethyl-4-piperidyl)-hexamethylene diamine; bis-(2,2,6,6-tetramethyl-4-piperidinyl) succinate; bis-(1-octyloxy-2,2,6,6-tetramethyl-4-piperidinyl) sebacate (Tinuvin® 123); bis-(1,2,2,6,6-pentamethyl-4-piperidinyl) sebacate (Tinuvin® 765); Tinuvin® 144; Tinuvin® XT850; tetrakis-(2,2,6,6-tetramethyl-4-piperidyl)-1,2,3,4-butane tetracarboxylate; N,N'-bis-(2,2,6,6-tetramethyl4-piperidyl)-hexane-1,6-diamine (Chimasorb® T5); N-butyl-2,2,6,6-tetramethyl-4-piperidinamine; 2,2'-[(2,2,6,6-tetramethylpiperidinyl)-imino]-bis-[ethanol]; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346); 5-(2,2,6,6-tetramethyl-4-piperidinyl)-2-cyclo-undecyl-oxazole) (Hostavin® N20); 1,1'-(1,2-ethane-di-yl)-bis-(3,3',5,5'-tetramethyl-piperazinone); 8-acetyl-3-dothecyl-7,7,9,9-tetramethyl-1,3,8-triazaspiro(4,5)decane-2,4-dione; polymethylpropyl-3-oxy-[4(2,2,6,6-tetramethyl)-piperidinyl]siloxane (Uvasil® 299); 1,2,3,4-butane-tetracarboxylic acid-1,2,3-tris(1,2,2,6,6-pentamethyl-4-piperidinyl)-4-tridecylester; copolymer of alpha-methylstyrene-N-(2,2,6,6-tetramethyl-4-piperidinyl) maleimide and N-stearyl maleimide; 1,2,3,4-butanetetracarboxylic acid, polymer with beta,beta,beta',beta'-tetramethyl-2,4,8,10-tetraoxaspiro[5.5]undecane-3,9-diethanol, 1,2,2,6,6-pentamethyl4-piperidinyl ester (Mark® LA63); 2,4,8,10-tetraoxaspiro[5.5]undecane-3,9-diethanol,beta, beta, beta', beta'-tetramethyl-polymer with 1,2,3,4-butanetetracarboxylic acid, 2,2,6,6-tetramethyl4-piperidinyl ester (Mark® LA68); D-glucitol, 1,3:2,4-bis-O-(2,2,6,6-tetramethyl-4-piperidinylidene)-(HALS 7); oligomer of 7-oxa-3,20-diazadispiro[5.1.11.2]-heneicosan-21-one-2,2,4,4-tetramethyl-20-(oxiranylmethyl) (Hostavin® N30); propanedioic acid, [(4-methoxyphenyl)methylene]-,bis(1,2,2,6,6-pentamethyl-4-piperidinyl) ester (Sanduvor® PR31); formamide, N,N'-1,6-hexanediylbis[N-(2,2,6,6-tetramethyl-4-piperidinyl (Uvinul® 4050H); 1,3,5-triazine-2,4,6-triamine, N,N'''-[1,2-ethanediylbis [[[4,6-bis[butyl(1,2,2,6,6-pentamethyl-4-piperidinyl)amino]-1,3,5-triazine-2-yl]imino]-3,1-propanediyl]]-bis[N', N''-dibutyl-N',N''-bis(1,2,2,6,6-pentamethyl-4-piperidinyl) (Chimassorb® 119 MW 2286); poly[[6-[(1,1,3,33-tetramethylbutyl) amino]-1,3,5-triazine-2,4-diyl][(2,2,6,6-tetamethyl-4-peperidinyl)-imino]-1,6-hexanediyl[(2,2,6,6-tetramethyl-4-piperidinyl)imino]](Chimassorb® 944 MW 2000-3000); 1,5-dioxaspiro (5,5) undecane 3,3-dicarboxylic acid, bis(2,2,6,6-tetramethyl-4-peridinyl) ester (Cyasorb® UV-500); 1,5-dioxaspiro (5,5) undecane 3,3-dicarboxylic acid, bis (1,2,2,6,6-pentamethyl-4-peridinyl) ester (Cyasorb® UV-516); N-2,2,6,6-tetramethyl-4-piperidinyl-N-amino-oxamide; 4-acryloyloxy-1,2,2,6,6-pentamethyl-4-piperidine. 1,5,8,12-tetrakis[2',4'-bis(1'',2'',2'',6'',6''-pentamethyl-4'-piperidinyl(butyl)amino)-1',3', 5'-triazine-6'-yl]-1,5,8,12-tetraazadodecane; HALS PB-41 (Clariant Huningue S. A.); Nylostab® S-EED (Clariant Huningue S. A.); 3-dodecyl-1-(2,2,6,6-tetramethyl-4-piperidyl)-pyrrolidin-2,5-dione; Uvasorb® HA88; 1,1'-(1,2-ethane-di-yl)-bis-(3,3',5,5'-tetra-methyl-piperazinone) (Good-rite® 3034); 1,1'1''-(1,3,5-triazine-2,4,6-triyltris((cyclohexylimino)-2,1-ethanediyl)tris(3,3,5,5-tetramethylpiperazinone) (Good-rite® 3150) and; 1,1',1''-(1,3,5-triazine-2,4,6-triyltris((cyclohexylimino)-2,1-ethanediyl)tris(3,3,4,5,5-tetramethylpiperazinone) (Good-rite® 3159). Tinuvin® and Chimassorb® materials are available from Ciba Specialty Chemicals; Cyasorb® materials are available from Cytec Technology Corp.; Uvasil® materials are available from Great Lakes Chemical Corp.; Saduvor®, Hostavin®, and Nylostab® materials are available from Clariant Corp.; Uvinul® materials are available from BASF; Uvasorb® materials are available from Partecipazioni Industriali; and Good-rite® materials are available from B.F. Goodrich Co. Mark® materials are available from Asahi Denka Co.

A preferred co-stabilizer for the thermoplastic polyamide composition is a HALS. Preferred HALS include high-molecular weight oligomeric or polymeric HALS having a molecular weight of more than about 1000, and preferably more than about 2000.

Other specific HALS are selected from the group consisting or di-(2,2,6,6-tetramethyl-4-piperidyl) sebacate (Tinuvin® 770, MW 481) Nylostab® S-EED (Clariant Huningue S. A.); 1,3,5-triazine-2,4,6-triamine, N,N'''-[1,2-ethanediyl-bis [[[4,6-bis[butyl(1,2,2,6,6-pentamethyl-4-piperidinyl)amino]-1,3,5-triazine-2-yl]imino]-3,1-propanediyl]]-bis[N', N''-dibutyl-N',N''-bis(1,2,2,6,6-pentamethyl-4-piperdinyl) (Chimassorb® 119 MW 2286); and poly[[6-[(1,1,3,33-tetramethylbutyl) amino]-1,3,5-triazine-2,4-diyl][(2,2,6,6-tetramethyl-4-peperidinyl)-imino]-1,6-hexanediyl [(2,2,6,6-tetramethyl-4-piperidinyl)imino]](Chimassorb® 944 MW 2000-3000).

Mixtures of secondary aryl amines and HALS may be used. A preferred embodiment comprises at least two co-stabilizers, at least one selected from the secondary aryl amines; and at least one selected from the group of HALS, as disclosed above, wherein the total weight percent of the mixture of co-stabilizers is at least 0.5 wt percent, and preferably at least 0.9 weight percent.

The molded or extruded thermoplastic article comprises 0 to less than 10 weight percent, preferably 5 weight percent % or less of one or more reinforcement agents. In a preferred embodiment the molded or extruded thermoplastic article includes no reinforcement agent. When a reinforcement agent is present, it may be any filler, but is preferably selected from the group consisting calcium carbonate, glass fibers with circular and noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof.

The molded or extruded thermoplastic article, optionally, comprises 0 to 50 weight percent of a polymeric toughener comprising a reactive functional group and/or a metal salt of a carboxylic acid. In one embodiment the molded or extruded thermoplastic article comprises 2 to 20 weight percent polymeric toughener selected from the group consisting of: a copolymer of ethylene, glycidyl (meth)acrylate, and optionally one or more (meth)acrylate esters; an ethylene/α-olefin or ethylene/α-olefin/diene copolymer grafted with an unsaturated carboxylic anhydride; a copolymer of ethylene, 2-isocyanatoethyl (meth)acrylate, and optionally one or more (meth)acrylate esters; and a copolymer of ethylene and acrylic acid reacted with a Zn, Li, Mg or Mn compound to form the corresponding ionomer.

In the present invention, the polyamide composition may also comprise other additives commonly used in the art, such other heat stabilizers or antioxidants, antistatic agents, blowing agents, lubricants, plasticizers, and colorant and pigments.

Other heat stabilizers include copper stabilizers, and mixtures thereof.

A significant advantage of the molded or extruded thermoplastic articles of the invention is that high thermal stability is provided without the use of conventional copper heat stabilizers. Copper heat stabilizers tend to act as corrosive agents over long periods of time at elevated temperatures; and in some environments actually cause degradation of semiaromatic polymers. Thus, another embodiment is molded or extruded thermoplastic article wherein said polyamide composition comprises less than 25 ppm copper as determined with atomic absorption spectroscopy.

Herein the polyamide composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

The polyamide composition having a polyhydroxy polymer, as disclosed above, is useful in increasing long-term heat stability at high temperatures of molded or extruded articles made therefrom. The long-term heat stability of the articles can be assessed by exposure (i.e., air oven ageing) of 4 mm thick test samples at a test temperature of 150° C. and the test period at or about 500 hours. The test bars, after air oven ageing, are tested for tensile strength and elongation to break, according to ISO 527-2/1A test method; and compared with unexposed controls having the same composition and shape, that are dry as molded (DAM). The comparison with the DAM controls provides the retention of tensile strength and/or retention of elongation to break, and thus the various compositions can be assessed as to long-term heat stability performance.

In various embodiments the thermoplastic polyamide composition has an AOA 150° C./500 hours retention of tensile strength of at least 50% and preferably at least 60, 70, 80, and 90%, based upon comparison with DAM non-exposed controls.

In another aspect, the present invention relates a use of the above disclosed polyamide compositions for high temperature applications.

In another aspect, the present invention relates to a method for manufacturing an article by shaping the thermoplastic composition of the invention. Examples of articles are films or laminates, automotive parts or engine parts or electrical/electronics parts. By "shaping", it is meant any shaping technique, such as for example extrusion, injection moulding, thermoform moulding, compression moulding or blow moulding. Preferably, the article is shaped by injection moulding or blow moulding.

The molded or extruded thermoplastic articles disclosed herein may have application in many vehicular components that meet one or more of the following requirements: high chemical resistance to polar chemicals such as such as zinc chloride and calcium chloride, high impact requirements; resistance to high temperature; resistance to oil and fuel environment; resistance to chemical agents such as coolants; low permeability to fuels and gases, e.g. carbon dioxide. Specific extruded or molded thermoplastic articles are selected from the group consisting of pipes for transporting liquids and gases, inner linings for pipes, fuel lines, air break tubes, coolant pipes, air ducts, pneumatic tubes, hydraulic houses, cable covers, connectors, canisters, and push-pull cables. Other non-automotive applications may be cable ties, and electrical/electronic connectors The present invention is further illustrated by the following examples. It should be understood that the following examples are for illustration purposes only, and are not used to limit the present invention thereto.

EXAMPLES

Methods

Compounding Method A

Examples and Comparative Examples using PA 6T/DT were prepared by melt blending the ingredients listed in the Tables in a 30 mm twin screw extruder (ZSK 30 by Coperion) operating at about 310° C. barrel setting using a screw speed of about 300 rpm, a throughput of 13.6 kg/hour and a melt temperature measured by hand of about 355° C. The glass fibers were added to the melt through a screw side feeder. Ingredient quantities shown in the Tables are given in weight percent on the basis of the total weight of the thermoplastic composition.

The compounded mixture was extruded in the form of laces or strands, cooled in a water bath, chopped into granules and placed into sealed aluminum lined bags in order to prevent moisture pick up. The cooling and cutting conditions were adjusted to ensure that the materials were kept below 0.15 wt % of moisture level.

Physical Properties Measurement

Mechanical tensile properties, i.e. E-modulus, stress at break (Tensile strength) and strain at break (elongation at break) were measured according to ISO 527-2/1A. Measurements were made on injection molded ISO tensile bars. Mold temperature for PA 6T/DT test specimens was 145-150° C.; and melt temperature was 325-330° C.

The thickness of the test bars was 4 mm and a width of 10 mm according to ISO 527/1A at a testing speed of 5 mm/min (tensile strength and elongation). Tensile Modulus was measured at 1 mm/min.

ASTM D256 Notched Izod test, Test Method A, was used to determined Notched Izod Impact Resistance.

Air Oven Ageing (AOA)

The test bars were heat aged in a re-circulating air ovens (Heraeus type UT6060) according to the procedure detailed in ISO 2578. At various heat aging times, the test bars were removed from the oven, allowed to cool to room temperature and sealed into aluminum lined bags until ready for testing. The tensile mechanical properties were then measured according to ISO 527 using a Zwick tensile instrument. The average values obtained from 5 specimens are given in the Tables.

Retention of tensile strength (TS) and elongation at break (EL) corresponds to the percentage of the tensile strength and elongation at break after heat aging for 500 hours in comparison with that of control bars, considered as being 100%. The control bars were of similar compositions and shape to the test bars, but tested dry as molded (DAM) and not subjected to AOA conditions.

Materials

PA6T/DT refers HTN501 NC010, a copolyamide of terephthalic acid, hexamethylenediamine, and 2-methyl-pentamethylenediamine having an inherent viscosity (IV), according to ASTM D2857 method, in the range of 0.8 to 0.95 (typically 0.88) and a melting point of about 300° C., and available from E.I. DuPont de Nemours and Company, Wilmington, Del., USA.

Engage® 8180 copolymer is an ethylene/octene copolymer from Dow Chemical, Houston, Tex., USA.

TRX® 301 copolymer is maleic anhydride modified EPDM from available from E.I. DuPont de Nemours and Company, Wilmington, Del., USA.

Soarnol® A refers to an ethylene vinyl alcohol copolymer that has about 56 mol % vinyl alcohol repeat units available from Nippon Gosei (Tokyo, Japan).

Cu heat stabilizer refers to a mixture of 7 parts of potassium iodide and 1 part of copper iodide in 0.5 part of a stearate wax binder.

Naugard® 445 hindered amine refers to 4,4'di(.α,60 -dimethylbenzyl)diphenylamine available commercially from Uniroyal Chemical Company, Middlebury, Conn.

Chimassorb® 119 is (1,3,5-triazine-2,4,6-triamine, N,N'''-[1,2-ethanediylbis[[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl)), supplied by Ciba Specialty Chemicals.

Wax OP is a lubricant manufactured by Clariant Corp., Charlotte, N.C.

Examples 1

Unreinforced PA6T/DT compositions of Examples 1 with EVOH and Comparative Example C-1-C-6 are listed in Table 1. Tensile properties after AOA at 150° C./500 h and % retention of elongation at break are listed in Table 1.

Example 1 comprising a combination of EVOH (Soarnol® A polymer) and secondary aryl amine (Naugard® 445 stabilizer) shows a % retention of elongation at break of 91% after AOA exposure at 150° C. for 500 h.

The heat stability performance of Example 1 is far superior to that of all comparative examples C1-C-6 under identical exposure conditions. For instance:

C-1, comprising only EVOH shows a % retention 15%;

C-2, comprising a known copper stabilizer, shows a % retention of 72%;

C-3, having no stabilizer, shows a % retention of 9%;

C-4, having only a secondary aryl amine (Naugard® 445 stabilizer) shows a % retention 14%;

C-5 and C-6, having a low molecular weight polyhydric alcohol, shows a % retention of 24 and 34%, respectively. These results are surprising and unexpected, and clearly shows the superior heat stability performance of a polydroxy polymer In combination with a co-stabilizer in polyamide compositions.

TABLE 1

| | Example | | | | | | |
|---|---|---|---|---|---|---|---|
| | C-1 | 1 | C-2 | C-3 | C-4 | C-5 | C-6 |
| PA6T/DT | 79.9 | 79.4 | 84.02 | 84.9 | 84.4 | 82.4 | 80.4 |
| TRX 301 | 8.44 | 8.44 | 8.44 | 8.44 | 8.44 | 8.44 | 8.44 |
| Engage ® 8180 | 6.46 | 6.46 | 6.46 | 6.46 | 6.46 | 6.46 | 6.46 |
| Soarnol A | 5 | 5 | | | | | |
| DPE | | | | | | 2 | 4 |
| Naugard 445 | | 0.5 | | | 0.5 | 0.5 | 0.5 |
| Wax OP | 0.2 | 0.2 | 0.2 | 0.2 | 0.2 | 0.2 | 0.2 |
| Copper heat stabilizer | | | 0.88 | | | | |
| Properties - DAM | | | | | | | |
| TS (MPa) | 57.3 | 66.3 | 70.3 | 68.0 | 69.0 | 66.2 | 65.9 |
| Elongation at break (%) | 5.3 | 7.8 | 9.6 | 9.5 | 8.5 | 12.2 | 11.5 |
| Notched Izod (kJ/m²) | 15.8 | 59.2 | 61.1 | 58.2 | 61.5 | 20.7 | 17.3 |

TABLE 1-continued

| | Example | | | | | | |
|---|---|---|---|---|---|---|---|
| | C-1 | 1 | C-2 | C-3 | C-4 | C-5 | C-6 |
| AOA 150° C. 500 h | | | | | | | |
| TS (MPa) | 21.3 | 67.0 | 75.4 | 18.0 | 33.0 | 48.2 | 60.1 |
| Retention TS (%) | 37 | 101 | 107 | 26 | 48 | 73 | 91 |
| Elongation at break (%) | 0.8 | 7.1 | 6.9 | 0.9 | 1.2 | 2.9 | 3.9 |
| Retention El (%) | 15 | 91 | 72 | 9 | 14 | 24 | 34 |

In all Tables:
TS = tensile strength;
EL = elongation to break

We claim:

1. A molded or extruded thermoplastic article comprising a thermoplastic polyamide composition comprising
   (a) a polyamide resin having a melting point and/or glass transition temperature;
   (b) 2 to 7 weight percent of one or more polyhydroxy polymer(s) selected from the group consisting of ethylene/vinyl alcohol copolymer having a number average molecular weight of at least 2000;
   (c) 0.1 to 1 weight percent of one or more co-stabilizer(s) having a 10% weight loss temperature, as determined by thermogravimetric analysis, of greater than 30° C. below said melting point of polyamide if said melting point is present, or at least 250° C. if said melting point is not present, said co-stabilizer is one or more secondary aryl amines;
   (d) 0 to less than 10 weight percent of one or more reinforcement agents; and
   (e) 0 to 20 weight percent of a polymeric toughener comprising a reactive functional group and/or a metal salt of a carboxylic acid;
   wherein molded 4 mm test bars prepared from said polyamide composition, and exposed at an test temperature of 150° C. for a test period of 500 hours, in an atmosphere of air, and tested according to ISO 527-2/1A, have, on average, a retention of elongation at break of at least 50 percent, as compared to that of an unexposed control of the same composition and shape; and wherein said polyamide resin comprises a one or more polyamides independently selected from the groups consisting of Group (III) Polyamides having said melting point of at least 210° C., and comprising
   (aa) about 20 to about 35 mole percent semiaromatic repeat units derived from monomers selected from one or more of the group consisting of:
      i. aromatic dicarboxylic acids having 8 to 20 carbon atoms and aliphatic diamines having 4 to 20 carbon atoms; and
   (bb) about 65 to about 80 mole percent aliphatic repeat units derived from monomers selected from one or more of the group consisting of:
      ii. an aliphatic dicarboxylic acid having 6 to 20 carbon atoms and said aliphatic diamine having 4 to 20 carbon atoms; and
      iii. a lactam and/or aminocarboxylic acid having 4 to 20 carbon atoms; and
Group (IV) Polyamides comprising
   (cc) about 50 to about 95 mole percent semiaromatic repeat units derived from monomers selected from one or more of the group consisting of:

i) aromatic dicarboxylic acids having 8 to 20 carbon atoms and aliphatic diamines having 4 to 20 carbon atoms; and
(dd) about 5 to about 50 mole percent aliphatic repeat units derived from monomers selected from one or more of the group consisting of:
ii) an aliphatic dicarboxylic acid having 6 to 20 carbon atoms and said aliphatic diamine having 4 to 20 carbon atoms; and
iii) a lactam and/or aminocarboxylic acid having 4 to 20 carbon atoms;
Group (V) Polyamides having said melting point of at least 260° C., and comprising
(ee) greater than 95 mole percent semiaromatic repeat units derived from monomers selected from one or more of the group consisting of:
ii) aromatic dicarboxylic acids having 8 to 20 carbon atoms and aliphatic diamines having 4 to 20 carbon atoms; and
(ff) less than 5 mole percent aliphatic repeat units derived from monomers selected from one or more of the group consisting of:
ii) an aliphatic dicarboxylic acid having 6 to 20 carbon atoms and said aliphatic diamine having 4 to 20 carbon atoms; and
iii) a lactam and/or aminocarboxylic acid having 4 to 20 carbon atoms; and
Group (VI) polyamides having no melting point, and selected from the group consisting of poly(hexamethylene isophthalamide/hexamethylene terephthalamide) (6I/6T) and poly(hexamethylene isophthalamide/hexamethylene terephthalamide/hexannethylene hexanediamide) (6I/6T/66).

2. The molded or extruded thermoplastic article of claim 1 wherein said polyamide resin is selected from Group (III) Polyamides.

3. The molded or extruded thermoplastic article of claim 1 wherein said polyamide resin is selected from Group (IV) Polyamides.

4. The molded or extruded thermoplastic article of claim 1 wherein said polyamide resin is selected from Group (V) Polyamides.

5. The molded or extruded thermoplastic article of claim 1 wherein said polyamide resin comprises a blend of two or more polyamides selected from the group consisting of Group (I) and Group (III) Polyamide, Group (I) and Group (VI) Polyamides, Group (II) and Group (III) Polyamides, Group (II) and Group (IV) Polyamides, Group (II) and Group (V) Polyamides, Group (II) and Group (VI) Polyamides, Group (III) and Group (VI) Polyamides, and Group (IV) and Group (V) Polyamides; wherein said Group (I) Polyamides have said melting point of less than 210° C., and comprise an aliphatic or semiaromatic polyamide selected from the group consisting of poly(pentamethylene decanediamide) (PA510), poly(pentamethylene dodecanediamide) (PA512), poly($\epsilon$-caprolactam/hexamethylene hexanediarnide) (PA6/66), poly($\epsilon$-caprolactam/hexamethylene decanediamide) (PA6/610), poly($\epsilon$-caprolactam/hexamethylene dodecanediamide) (PA6/612), poly(hexamethylene tridecanediamide) (PA613), poly(hexamethylene pentadecanediamide) (PA615), poly($\epsilon$-caprolactam/tetramethylene terephthalamide) (PA6/4T), poly($\epsilon$-caprolactam/hexamethylene terephthalamide) (PA6/6T), poly($\epsilon$-caprolactam/decamethylene terephthalamide) (PA6/10T), poly($\epsilon$-caprolactam/dodecamethylene terephthalamide) (PA6/12T), poly(hexamethylene decanediamide/hexamethylene terephthalamide) (PA610/6T), poly(hexamethylene dodecanediamide/hexamethylene terephthalamide) (PA612/6T), poly(hexamethylene tetradecanediamide/hexamethylene terephthalamide) (PA614/6T), poly($\epsilon$-caprolactam/hexamethylene isophthalamide/hexamethylene terephthalamide) (PA6/6I/6T), poly($\epsilon$-caprolactam/hexamethylene hexanediamide/hexamethylene decanediamide) (PA6/66/610), poly($\epsilon$-caprolactam/hexamethylene hexanediamide/hexamethylene dodecanediamide) (PA6/66/612), poly($\epsilon$-caprolactam/hexamethylene hexanediamide/hexamethylene decanediamide/hexamethylene dodecanediamide) (PA6/66/610/612), poly(2-methylpentanriethylene hexanediamide/hexamethylene hexanediamide/hexamethylene terephthalamide) (PA D6/66/6T), poly(2-methylpentarnethylene hexanediamide/hexamethylene hexanediamide/) (PA D6/66), poly(decamethylene decanediamide) (PA1010), poly(decamethylene dodecanediamide) (PA1012), poly(decamethylene decanediamide/decamethylene terephthalamide) (PA1010/10T) poly(decamethylene decanediamide/dodecamethylene decanediamide/decamethylene terephthalamide/dodecamethylene terephthalamide (PA1010/1210/10T/12T), poly(11-aminoundecanamide) (PA11), poly(11-aminoundecanamide/tetrannethylene terephthalamide) (PA11/4T), poly(11-aminoundecanamide/hexamethylene terephthalamide) (PA11/6T), poly(11-aminoundecanamide/decamethylene terephthalamide) (PA11/10T), poly(11-aminoundecanannide/dodecamethylene terephthalamide) (PA11/21), poly(12-aminododecanamide) (PA12), poly(12-aminododecanamidenetramethylene terephthalamide) (PA12/4T), poly(12-aminododecanamide/hexamethylene terephthalamide) (PA12/6T), poly(12-aminododecanamide/decamethylene terephthalamide) (PA12/10T) poly(dodecamethylene dodecanediamide) (PA1212), and poly(dodecamethylene dodecanediamide/dodecarnethylene dodecanediarnide/dodecamethylene terephthalamide) (PA1212/12T); and Group (II) Polyamides have said melting point of at least 210° C., and comprise an aliphatic polyamide selected from the group consisting of poly(tetramethylene hexanediamide) (PA46), poly($\epsilon$-caprolactam) (PA 6), poly(hexamethylene hexanediamide/($\epsilon$-caprolactam/) (PA 66/6) poly(hexamethylene hexanediamide) (PA 66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), poly(hexamethylene hexadecanediamide) (PA616), and poly(tetramethylene hexanediarnide/2-methylpentannethylene hexanediamide) (PA46/D6).

6. The molded or extruded thermoplastic article of claim 5 wherein said polyamide resin comprises a blend of Group (II) and Group (V) Polyamides.

7. The molded or extruded thermoplastic article of claim 6 wherein said polyamide resin comprises a blend comprising poly(hexamethylene hexanediamide) (PA 66) and poly(hexamethylene terephthalamide/2-methylpentamethylene terephthalamide) (PA 6T/DT).

8. The molded or extruded thermoplastic article of claim 1 wherein the one or more polyhydroxy polymer(s) comprises an ethylene/vinyl alcohol copolymer and has a vinyl alcohol content of 40 to 75 mol %, wherein the remainder mol % is ethylene.

9. The molded or extruded thermoplastic article of claim 1 wherein said polyamide composition comprises less than 25 ppm copper as determined with atomic absorption spectroscopy.

10. The molded or extruded thermoplastic article of claim 1 wherein the article is selected from the group consisting of pipes for transporting liquids and gases, inner linings for pipes, fuel lines, air break tubes, coolant pipes, air ducts, pneumatic tubes, hydraulic houses, cable covers, cable ties, connectors including electrical/electronic connectors, canisters, and push-pull cables.

\* \* \* \* \*